(12) United States Patent
Mahlab

(10) Patent No.: US 8,385,738 B2
(45) Date of Patent: Feb. 26, 2013

(54) METHOD AND APPARATUS FOR ROUTING DATA-CARRYING OPTICAL SIGNALS

(75) Inventor: Uri Mahlab, Or Yehuda (IL)

(73) Assignee: ECI Telecom Ltd., Petach Tikva (IL)

( * ) Notice: Subject to any disclaimer, the term of this patent is extended or adjusted under 35 U.S.C. 154(b) by 1679 days.

(21) Appl. No.: 09/936,440

(22) PCT Filed: Jan. 23, 2001

(86) PCT No.: PCT/IL01/00063
§ 371 (c)(1),
(2), (4) Date: Jan. 25, 2002

(87) PCT Pub. No.: WO01/56230
PCT Pub. Date: Aug. 2, 2001

(65) Prior Publication Data
US 2003/0007218 A1   Jan. 9, 2003

(30) Foreign Application Priority Data
Jan. 25, 2000 (IL) .......................... 134218

(51) Int. Cl.
*H04B 10/00* (2006.01)
(52) U.S. Cl. ................ 398/49; 398/50; 398/51
(58) Field of Classification Search ........... 398/45–57
See application file for complete search history.

(56) References Cited

U.S. PATENT DOCUMENTS

| | | | |
|---|---|---|---|
| 5,253,250 A | 10/1993 | Schlafer et al. | |
| 5,488,501 A * | 1/1996 | Barnsley | 398/51 |
| 5,541,756 A | 7/1996 | Chang-Hasnain et al. | |
| 5,617,233 A | 4/1997 | Boncek | |
| 5,912,753 A | 6/1999 | Cotter et al. | |
| 5,982,516 A | 11/1999 | Murphy et al. | |
| 6,160,652 A * | 12/2000 | Nir | 398/1 |
| 6,600,583 B1 * | 7/2003 | Fatehi et al. | 398/82 |

FOREIGN PATENT DOCUMENTS

EP   0 794 683 A2   9/1997

OTHER PUBLICATIONS

Joseph Y. Hui, "Pattern Code Modulation and Optical Decoding—A Novel Code-Division Multiplexing Technique for Multifiber Networks", *IEEE Journal on Selected Areas in Communication*, 1985, pp. 916.927, vol. 3, No. 6.
G. Jeong et al., "Comparison of Wavelength-Interchanging and Wavelength-Selective Cross-Connects in Multiwavelength All-Optical Networks", *Proceedings of Infocom*, 1996, pp. 156-163, vol. Conf. 15, IEEE Comp. Soc. Press.

* cited by examiner

*Primary Examiner* — Agustin Bello
(74) *Attorney, Agent, or Firm* — Browdy & Neimark, P.L.L.C.

(57) ABSTRACT

A method is provided for routing optical data, which method comprises transmitting optical addressing data to a first network element having routing capabilities, assigning an appropriate optical link connecting the first network element with a second network element where the assignment is based on the optical addressing data, and transmitting the optical data via the assigned optical link.

22 Claims, 5 Drawing Sheets

METHOD AND APPARATUS FOR ROUTING DATA-CARRYING OPTICAL SIGNALS

FIELD OF THE INVENTION

The present invention relates to the field of data packet switching. More particularly, the invention relates to a method and apparatus for routing high speed optical data by using a control header which comprises an optical routing address that is transmitted optically.

BACKGROUND OF THE INVENTION

Many modern communication networks employ optical transmission of data packets. The main advantage of optical transmission is almost unlimited bandwidth, which allows transmitting data at high rates. Data is divided into packets, each of which contain information that should be delivered to a destination, and a header that contains the routing data. The routing data comprises address information which is used to route the data through a series of switching nodes to its destination. Each switching node decodes the address information by processing the header information and switching the packet onto a proper communication link (usually using a routing table that is stored in each switching node). The same procedure is repeated at the next node and so forth, until the packet reaches its destination.

Conventional routing methods of data packets in optical networks employ electrical processing of the header information, which is carried out at each switching node. However, due to hardware limitations such electrical processing is performed in a relatively low rate, and therefore the "decision" made at each switching node, through which communication link to forward each packet is delayed. Therefore, the overall delay time of each delivered packet from source to destination is increased.

U.S. Pat. No. 5,253,250 discloses an apparatus for switching of high speed optical data with the header information transmitted separately on a sub-carrier frequency. The header information is sub-carrier multiplexed with the data packet and is then transmitted at a lower rate than the information frame rate, so as to allow header processing by less expensive receivers. However, the data packet is delayed by an optical buffer for the time required for the switch to process the header information.

European Patent Application EP 794683A2 discloses an optical ATM self-routing switching system with reduced routing header bits. The switching system comprises a plurality of interface means responsive to an incoming ATM cell for producing an optical ATM cell containing a routing bit located in a time slot corresponding to the its destination. This allows to reduce the optical header bits and improve the data throughput. However, the remaining bits in the header are still electrically processed and therefore the routing of the optical information data is delayed.

U.S. Pat. No. 5,912,753 discloses an optical network in which a packet is routed by performing a logic operation between an address word carried in its header and a predetermined discriminator word. A routing decision is made according to the result of the logic operation. However, the logic operation is performed by electrically processing and therefore the routing of the optical information data is delayed.

U.S. Pat. No. 5,617,233 discloses a transparent optical node (TON) structure for use in optical packet switching architecture. Routing is performed by using a separate wavelength to carry the header information. The header portion of the packet is removed from the data portion and can be rewritten before reinsertion. Still, even only the header portion requires processing time to determine the desires routing decision, and therefore delays the packet routing.

U.S. Pat. No. 5,982,516 discloses an optical network in which data signals are encoded with a wavelength that corresponds to the destination address, so that data is routed in accordance with which of the switch characteristic wavelengths, matches the data encoding wavelength.

All the methods described above have not yet provided satisfactory solutions to the problem of providing method and apparatus for routing high speed optical data by using an optical routing address.

It is therefore an object of the present invention to provide a method and apparatus for routing high speed optical data, which overcome the drawbacks of prior art.

It is another object of the present invention to provide a method and apparatus for routing high speed optical data by using a control header which comprises an optical routing address that is transmitted optically.

It is another object of the present invention to provide a method and apparatus for routing high speed optical data by using an optical routing address which requires simple electrical processing.

Other objects and advantages of the invention will become apparent as the description proceeds.

SUMMARY OF THE INVENTION

The present invention is directed to a method for routing optical data. By a first embodiment of the invention, the method provided comprises transmitting optical addressing data to a network element having routing capabilities, assigning an appropriate optical link in the network element where the assignment is based on the addressing data, and transmitting the optical data via the optical link thus assigned. The network element in accordance with the present invention is a device provided with routing capabilities, e.g. a router, and the like. For the sake of convenience such a network element will be referred to hereinafter as a "router", but this term should be understood to encompass also any other device having switching and forwarding capabilities. The addressing information required for establishing such an address for routing the optical data signals is derived from a combination of the optical addressing signals. By an embodiment of the invention, first optical addressing signals are generated by converting signals identifying a destination address into corresponding optical addressing signals. The optical addressing signals are transmitted over one or more optical addressing links to a first router and the optical data signals are concurrently or subsequently transmitted to the first router via an optical data link. Preferably, second optical addressing signals are generated, defining the next section of a transmission path extending from the first router towards the destination address. The second optical addressing signals are then transmitted over one or more optical addressing links extending between the first router and a second router. The optical data signals are concurrently or subsequently transmitted to the second router via an optical data link extending between the first router and the second router. The process is repeated until the optical data signals are transmitted to the destination address via subsequent routers located along a transmission path extending towards the destination address.

The information may be extracted from at least one of the optical addressing signals transmitted at one of two binary illumination states. At least one of the optical addressing signals may be transmitted at a certain illumination level whereas at least one other optical addressing signal is presented by absence of illumination.

According to another embodiment of the invention, at least two of the optical addressing signals may be transmitted each at substantially the same wavelength and at a different illumination intensity and wherein each of the illumination intensities corresponds to a different addressing information. Alternatively, at least two of the optical addressing signals may be transmitted each at substantially the same intensity and at a different wavelength, and wherein each of the different wavelengths corresponds to a different addressing information An optical address may be derived from a combination of at least two optical addressing signals each transmitted at a different wavelength and/or at a different intensity from the other.

According to a preferred embodiment of the invention, the transmission of at least one of the optical data signals is delayed until the following steps are performed:
 a) decoding the optical addressing signals;
 b) deriving addressing information from the decoded optical addressing signals; and
 c) if required, generating another, or using the, optical routing address for further routing of the optical data signals.

The transmission of the at least one of the optical data signals may be delayed by allowing the at least one of the optical data signals to pass through an optic fiber of a length corresponding to a desired delay in the transmission.

In accordance with yet another preferred embodiment of the invention, optical data signals are routed by:
 a) generating first optical addressing signals by converting the signals identifying a destination address into corresponding optical addressing signals;
 b) assigning optical addressing links towards the destination address;
 c) establishing a data transmission path between a transmission source transmitting the optical addressing signals over one or more and a destination for the transmission of the optical data signals;
 d) transmitting an indication that the optical data signals can be forwarded towards their destination;
 e) receiving the indication; and
 f) transmitting the optical data signals towards the destination along the data transmission path.

The indication may be an optical indication signal, transmitted to the transmission source via the data transmission path, an electric indication signal, and the like.

The invention is also directed to an apparatus for transmitting optical data signals using one or more optical addressing links for carrying optical addressing signals, the combination of which provides addressing information required for establishing an address for routing the optical data signals that are transmitted via an optical data link.

By still another embodiment of the invention, the apparatus comprises
 a) means for generating first optical addressing signals by converting signals identifying a destination address into corresponding optical addressing signals;
 b) means for transmitting the optical addressing signals over one or more optical addressing links to a first router; and
 c) means for transmitting the optical data signals to the first router via an optical data link.

According to another embodiment of the invention there is provided an apparatus that comprises:
 a) means for receiving first optical addressing signals;
 b) means for generating second optical addressing signals associated with the next section of a transmission path extending towards the destination address;
 c) means for transmitting the second optical addressing signals over one or more optical addressing links extending towards the destination address;
 d) means for receiving the optical data signals; and
 e) means for transmitting the optical data signals received towards the destination address.

According to a preferred embodiment of the invention, the apparatus comprises:
 a) means for delaying optical data signals;
 b) means for decoding the optical addressing data;
 c) means for deriving addressing information from the decoded optical addressing signals; and
 d) means for generating optical routing address for further routing of optical data signals.

An optic fiber may be included for delaying the transmission of at least one of the optical data signals and means for directing the at least one of the optical data signals to pass through the optic fiber.

According to still a further embodiment of the invention there is provided an apparatus that comprises:
 a) means for receiving optical addressing signals;
 b) circuitry for converting received optical addressing signals into routing signals;
 c) a memory for storing predetermined and/or updated routing signals;
 d) circuitry for comparing the routing signals with stored electrically represented addressing data stored in the memory;
 e) means for generating optical addressing signals corresponding to said optical data signals' destination address;
 f) means for transmitting said optical addressing signals over one or more optical addressing links towards said destination address; and
 g) circuitry for directing the incoming optical data signals to the corresponding outgoing optical data link by controlling the optical connection between incoming and outgoing optical paths according to the results of the comparison.

By another aspect of the present invention, there is provided a system comprising:
 a) at least one data source for sending optical data signals to a destination over an optical data link;
 b) at least one destination for receiving optical data signals sent from the source over the optical data link; and
 c) at least one optical router for routing optical data signals transmitted from the data source towards the destination, according to optical addressing data transmitted to the optical router before assigning an appropriate optical link in the optical router by using the addressing data.

In accordance with an embodiment of the invention, the telecommunication system provided comprises:
 a) means for generating first optical addressing signals by converting the signals identifying a destination address into corresponding optical addressing signals;
 b) means for transmitting the optical addressing signals over one or more optical addressing links towards the destination address;
 c) a data transmission path extending between a transmission source and a destination for the transmission of the optical data signals;
 d) means for transmitting to the transmission source an indication that the optical data signals can be forwarded towards their destination;
 e) means for receiving the indication; and f) means for transmitting the optical data signals responsive to receiving said indication, towards the destination along the data transmission path.

Preferably, the telecommunication system comprises one or more optical addressing links for carrying a combination of optical addressing signals to the router, the combination provides addressing information required for establishing an address for routing the optical data signals.

By using the term optical data signals, it is meant to include data-carrying optical signals, out-band optical signals, message's optical signals, indication optical signals, addressing optical signals and the like. By using the term routing signals, it is meant to include any type of signals (e.g., electrical digital or analogue signals) that can be extracted from the received optical address and used for controlling optical routing hardware according to the received addressing information.

BRIEF DESCRIPTION OF THE DRAWINGS

The above and other characteristics and advantages of the invention will be better understood through the following illustrative and non-limiting detailed description of preferred embodiments thereof, with reference to the appended drawings, wherein.

DETAILED DESCRIPTION OF PREFERRED EMBODIMENTS

Figure 1:
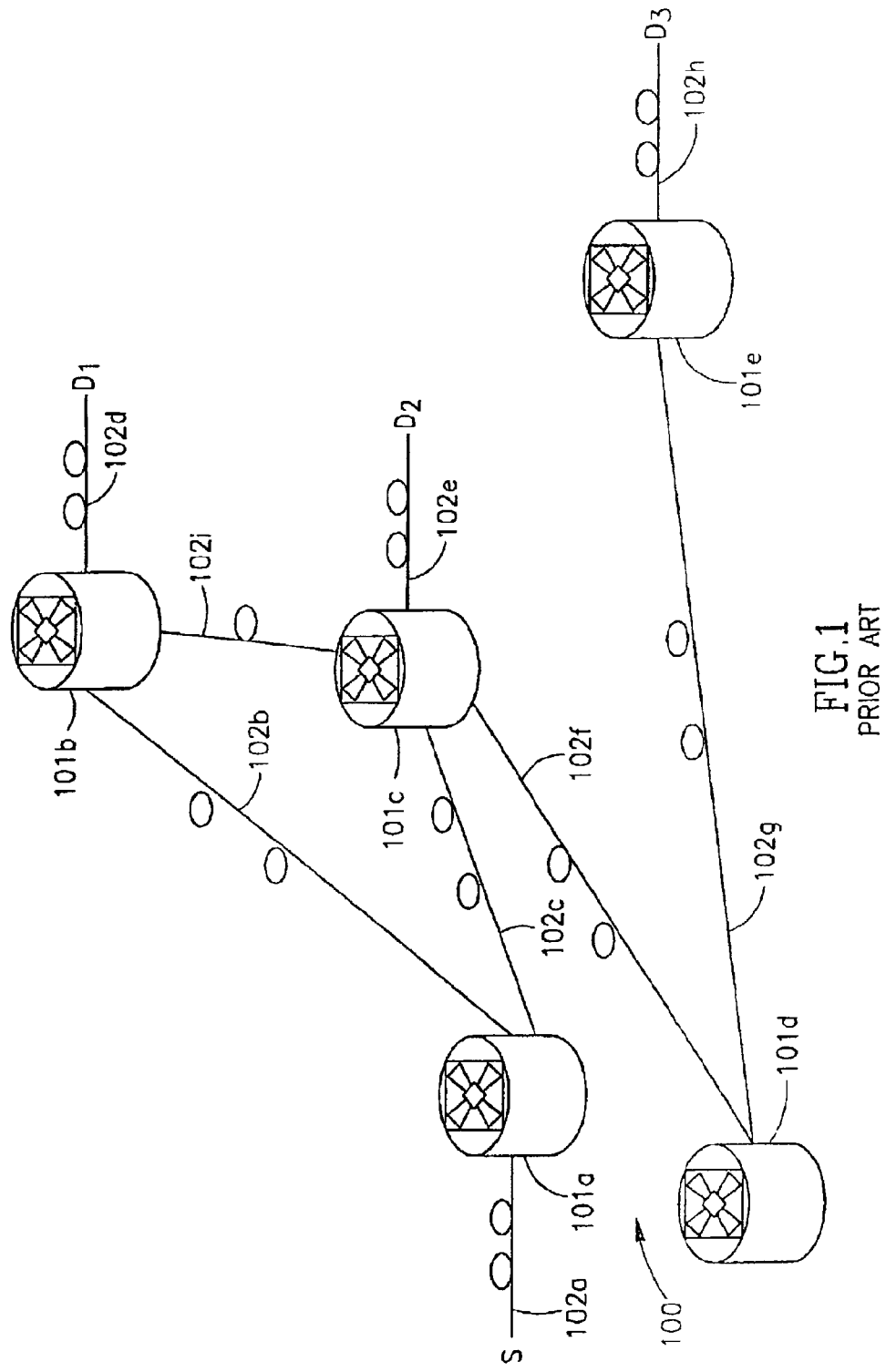
FIG. 1 schematically illustrates the structure of a conventional optical data network.

FIG. 1 schematically illustrates the structure of a conventional optical data network. The system 100 comprises a plurality of routers 101a to 101e, each of which is used to direct data carried from a source to a destination by way of an optical signal routed through several routers that are connected by a set of optical links 102a to 102i, such as optic fibers. For example, data from source S intended to destination D1 can be directed to its destination by routers 101a and 101b through links 102a, 102b and 102d, or alternatively by routers 101a 101c and 101b through links 102a, 102c, 102i and 102d. Each router comprises a routing table which determines to which router and through which link the data will be forwarded at each step, until the last router opens (or switches) the corresponding link to the destination. These routing tables are periodically updated according to varied traffic loads and network availability. IP routing procedure as known in the art per se is an example of a procedure where such a periodic update is carried out. Each router comprises an array (a "router matrix") of controlled optical switches that are activated according to the destination address and to the updated routing tables. Conventional optical switching schemes employ electrical processing of each data packet by reading the header information and extracting the destination address of that packet. The extracted address is presented to the routing table of each router and in response the router selects the next router and a corresponding optical link, through which the optical (data carrying) signal will be forwarded so as to proceed to its proper destination. In addition, the router may also convert the extracted address to another address which represents the destination in the routing table of the next router (i.e., each router may have different address code for the same destination). Typically, the switching operation is carried out by deflecting the light beam using a device such as electrically controlled prisms, mirrors, liquid crystals and the like.

Figure 2:
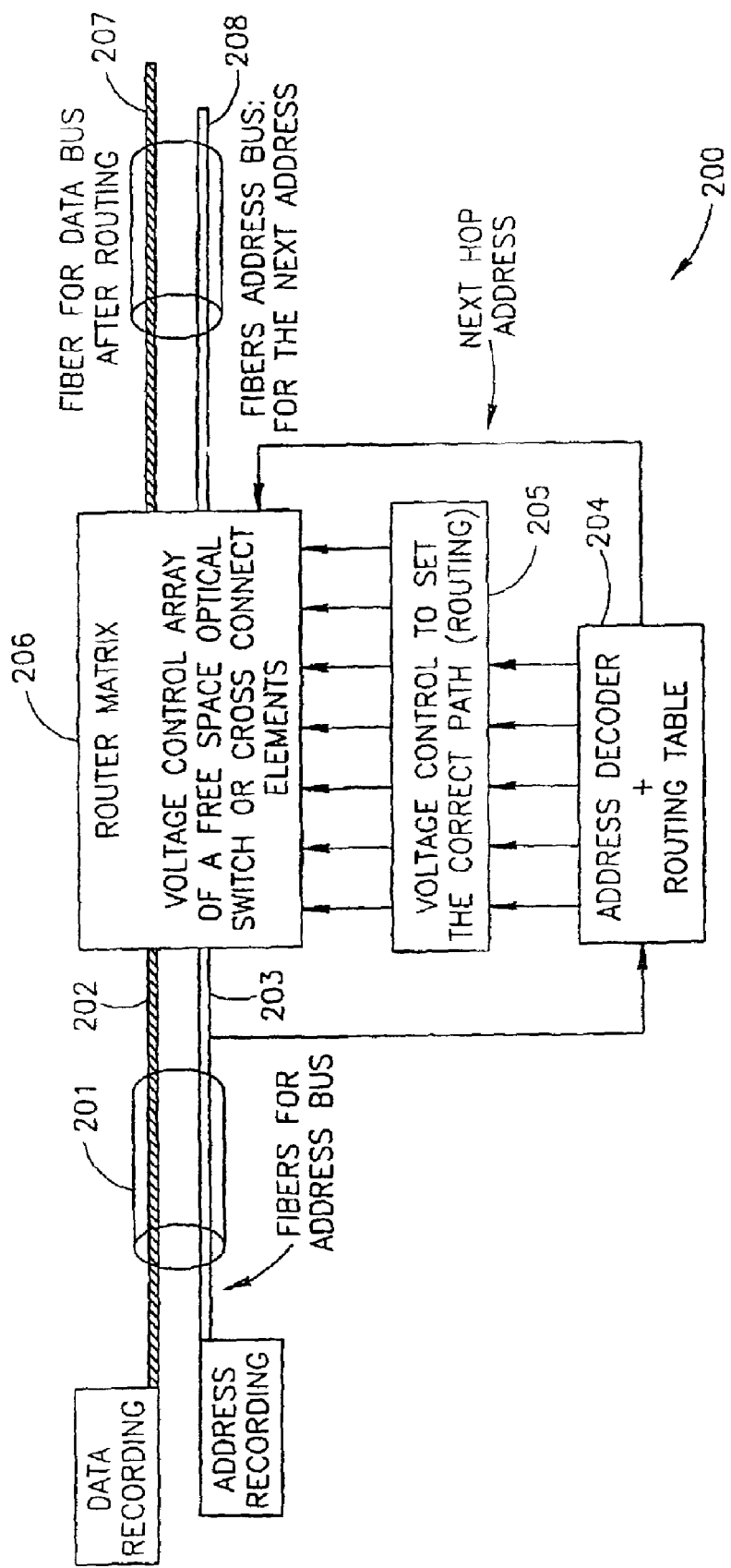
FIG. 2 schematically illustrates the structure of a routing system of data carrying light beam used in an optical router, according to a preferred embodiment of the invention.

Contrary to prior art routing scheme, a preferred embodiment of the present invention is schematically illustrated in FIG. 2, wherein the structure of a routing system of data carrying light beam used in an optical router, is illustrated. The system 200 comprises an optical link 201 which comprises an optical data bus 202 and an optical address bus 203. The optical data bus 202 may consist of an optic fiber which is connected between the router and the data source S and/or its neighboring routers. The optical address bus 203 consists of a bundle of optic fibers which together form the routing address by an optical image. For example, if the bundle comprises eight fibers, each fiber may represent at least two logical states, in case when a binary address is used. The first logic level may emulate a "1" logic by illuminating the fiber with laser radiation (light) emitted from a laser diode and the second logic level may emulate a "0" logic by deactivating the laser diode (no light in the fiber). This binary combination allows to obtain up to $256=2^8$ different routing addresses. The optical image thus received is detected by an array of electro-optical address detectors 204 by using a plurality of photo-sensitive elements (e.g., a photodiode) each located at the end of each fiber. Each of the photo-sensitive elements detects the emitted light and outputs a corresponding electric signal which is converted to a logic level. The combination of all logic levels of each fiber in the bundle forms the routing address. The routing address is compared with the contents of the routing table of the router and the comparison result is used to generate a control signal. The generated control signal is fed into a controller 205 which outputs a corresponding voltage to each optical switch within the router. In response, the array of optical switches contained in the router matrix 206 is controlled so that the desired optical switch routes (deflects) the data carrying light arriving into the router through the optical data bus 202 (from the source or from the preceding router), to the selected optical link that connect the current router to the next router. In parallel, a new optical address is generated using the address data which is stored in the routing table and the destination, so as to deliver a new addressing data to the next router.

The new optical address is generated by an array of light emitting sources such as laser diodes, Light Emitting Diodes (LEDs) and the like, each of which is attached to an optic fiber within the bundle that leads to the next router. The resulting new optical address is carried by a new bundle of optic fibers 208, which in parallel with the data bus of the next optical link 207, is directed to the next router. The next router decodes it and uses the (decoded) extracted address to route the arriving optical data to another router. This process continues from each router to the next router, while each router controls its optical switches to direct an incoming data carrying light beam according to the destination and the current contents of its routing table, until data carrying light beam can reach the last router. Finally the last router allows the optical link to reach the destination.

From that point the complete optical link (i.e., optical connection between source and destination) is open for data transmission from the data source to its destination, via the corresponding routers and optical links. According to a preferred embodiment of the invention, after opening the complete optical link for data transmission, an optical indication signal is transmitted from the last router via the opened link back to the source. This indication signals the data source that the complete optical link is open and enables the source to start transmitting data. Once the link is open, relatively large amount of data can be transmitted over the link to the destination. The indication signal may be for example light of a specific wavelength, which may even be visible, such as "coloring" the complete opened channel with red light. Of course, other signaling techniques may be implemented. The optical indication signal is detected at the source (e.g., by a photo-sensitive element) and enables data transmission. Since the signaling and routing addresses are delivered optically, the operations required to establish the link may be carried out relatively fast (essentially at light velocity). Therefore, the remaining electrical operations (optical address decoding/encoding and controlling the optical switches) are simplified and the whole transmission process is carried out rapidly.

Of course, more addresses can be obtained according to another preferred embodiment of the invention, by using more options than the "ON/OFF" type of method described above. Such options may further comprise different illumination levels in each fiber and/or different wavelengths in each fiber (e.g., different colors of laser light) or any combination thereof, which substantially increase the number of addresses that can be obtained using a given number of fibers in a bundle. Alternatively, using such options may decrease the number of fibers required in a bundle for a given number of addresses.

Figure 3:
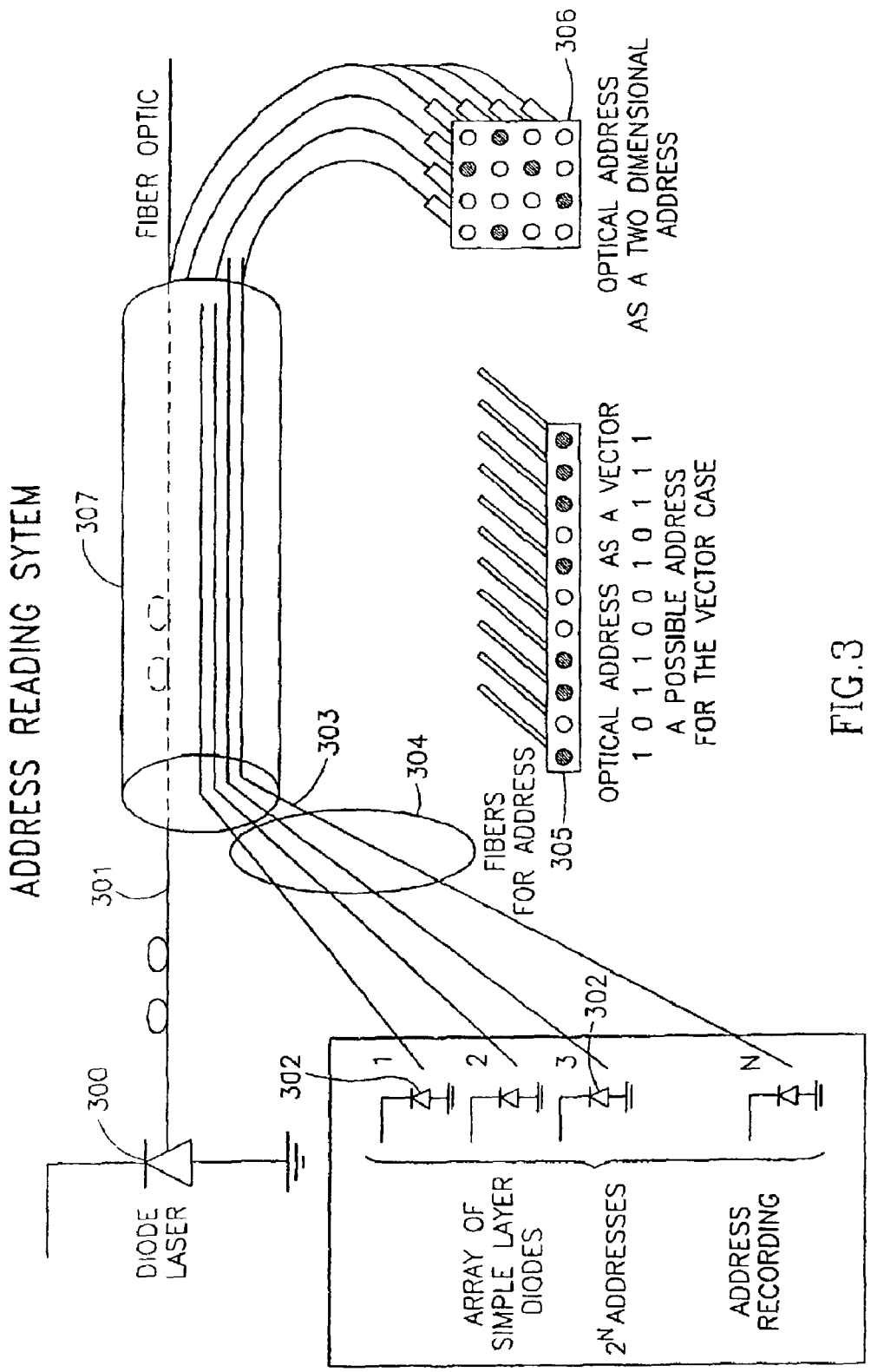
FIG. 3 schematically illustrates the generation of an optical address, according to a preferred embodiment of the invention.

FIG. 3 schematically illustrates the generation of an optical address, according to a preferred embodiment of the invention. The optical link 301 comprises a laser diode 300 at its distal end, which emits light that is modulated by the data that should be transmitted. The modulated light is radiated to an optic fiber 301. An array of N light emitting sources 302, such as laser diodes is controlled to generate a combination of lighted/unlighted pixels, each of which corresponds to a specific light emitting source. The light of each pixel is radiated into a corresponding optic fiber 303 and represents an element of the desired routing address. The optical link 301 also comprises the resulting bundle 304 of N optic fibers, which represents the optical address bus. The fibers in bundle 304 may be arranged in a way that the optic image received therefrom represents the optical address as a vector 305, or as an array 306 having any applicable geometrical arrangement. In this example, the dark points in the vector 305 (or array 306) represent a lit fiber that corresponds to "1" logic and the brighter points represent an obscure fiber that corresponds to "0" logic. Therefore, the optical address in this example represents the binary combination "1,0,1,1,0,0,1,0,1,1,1" (of $2^{11}$ possible combinations).

Figure 4:
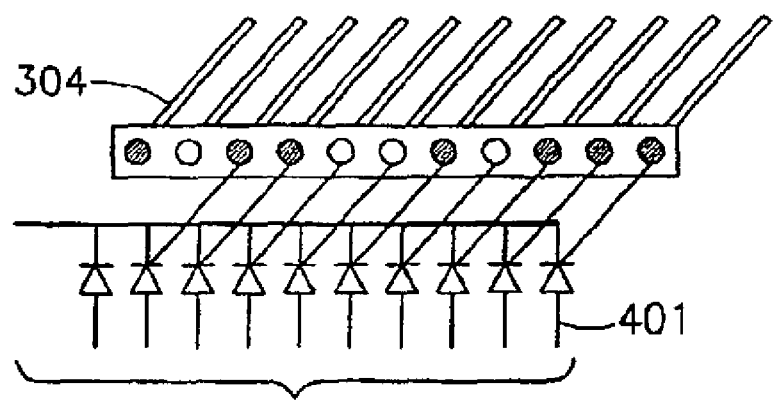
FIG. 4 schematically illustrates the decoding of an optical address, according to a preferred embodiment of the invention.

FIG. 4 schematically illustrates the decoding of an optical address, according to a preferred embodiment of the invention. An array of N photo-sensitive components, such as photodiodes 401 are located at the end of each fiber 303 of the bundle (of N fibers) 304. Each photo-sensitive component receives the light emitted (if emitted) from its corresponding fiber and in response outputs a related electric signal which is then transformed into a corresponding logic level. The combination of N logic levels forms the desired address (of $2^N$ possible combinations in the case of "ON/OFF" keying method).

Figure 5:
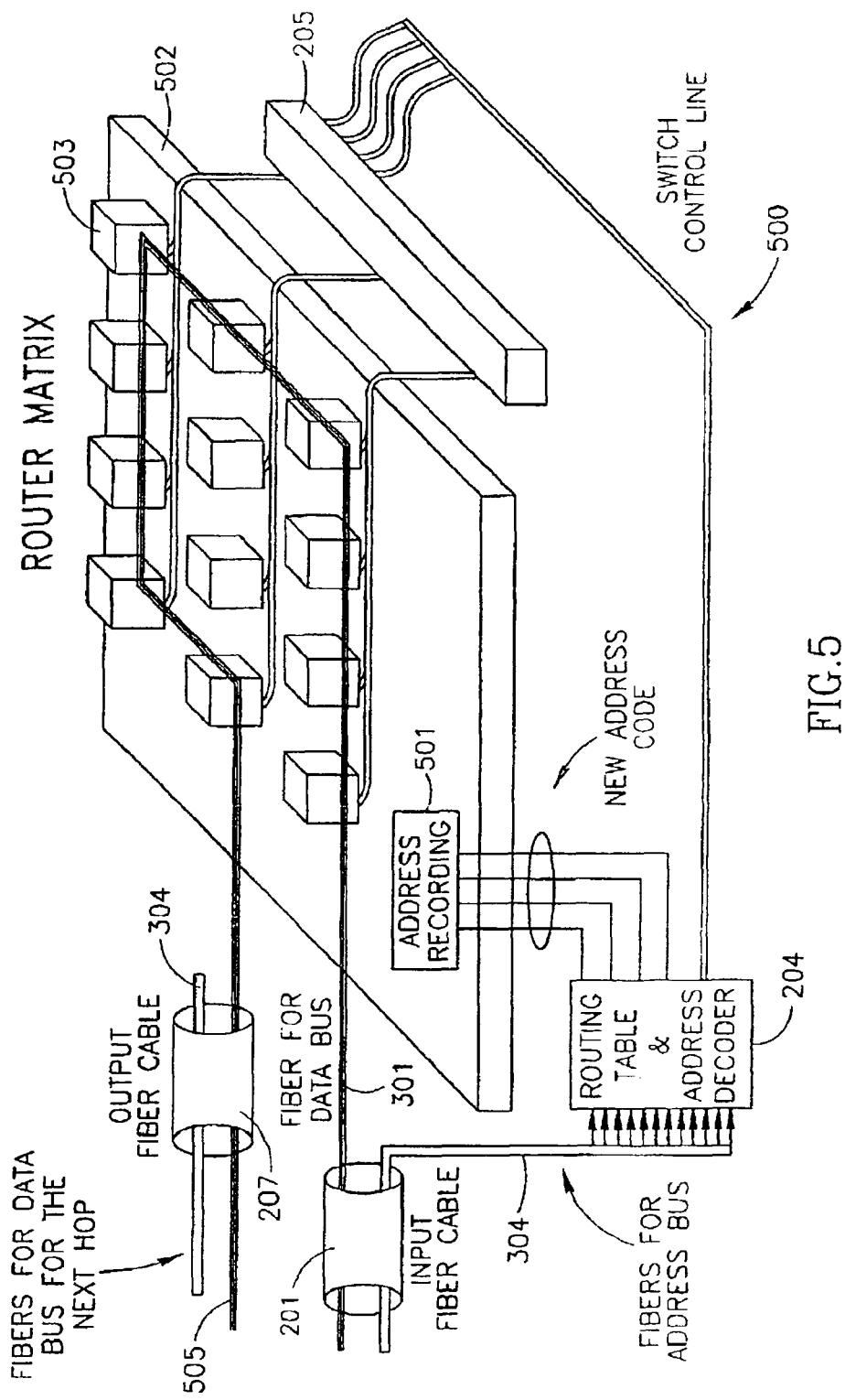
FIG. 5 schematically illustrates the structure of a router with optical addressing system, according to a preferred embodiment of the invention.

FIG. 5 schematically illustrates the structure of a router with optical addressing system, according to a preferred embodiment of the invention. The router 500 comprises a router matrix 502 consisting of a plurality of voltage controlled optical switches 503. Incoming optical data carrying signal is input to the router matrix 502 via the data fiber 301. The bundle 304 of address fibers are input into the electro-optical address detector 204 and the address is extracted from the light information carried by the bundle 304. The address is compared to the contents of the router's routing table and a set of resulting corresponding signals is input to the controller 205, which controls the optical switches 503 to open the desired optical path, so as to direct an incoming data carrying light beam to the output (next) optical cable 207. Cable 207 essentially comprises the address fibers' bundle 304, and data fiber 505. In addition, the resulting signals are input to an address generator 501, so as to generate a new optical address according to the current addressing information resulting from the combination of the routing table and the received optical address. The new optical address is transmitted via another bundle 304.

According to another preferred embodiment of the invention, data packets can be transmitted from a router to the next router, by generating optical delay of the data carrying optical signal, so as to enable each router to decode the optical address and to allow the required optical link to the next router. Such delay may be obtained by using an optical link which is implemented by using a relatively long optic fiber. A longer fiber provides longer delay time. By doing so, packets can be transmitted via the optical link without waiting until the complete optical link is established. In addition, optical signaling from the last router back to the source, indicating that the link is established is not required. Data packets are transmitted from the source to the first router over the data fiber (which is sufficiently long to delay the optical data), in parallel with their corresponding optical address which is optically transmitted over the address fibers' bundle. The router decodes the optical address and allows the corresponding link to the next router, according to its routing table. The delay time is determined so that the delayed optical data reaches the router after the corresponding link to the next router is already established and the next address is generated, and proceeds to the next router over another data fiber, which again delays the optical data, until the next router opens the next corresponding link. This process may be continued, until the optical data reaches the last router.

Furthermore, such an arrangement for inducing delays in the transmission of optical data may also include devices such as amplifiers, receive/transmit units or any other applicable devices that are adapted to compensate for the signal degradation that may occur when long delay fibers are incorporated in the data transmission path.

The above examples and description have of course been provided only for the purpose of illustration, and are not intended to limit the invention in any way. As will be appreciated by the skilled person, the invention can be carried out in a great variety of ways, employing more than one technique from those described above, all without exceeding the scope of the invention.

The invention claimed is:

1. In a telecommunication system, a method for routing optical data signals using a first communication path comprising at least one optical fiber extending between at least two network elements of the telecommunication system for carrying optical data signals separated from their associated optical addressing signals, and a second communication path comprising one or more optical fibers extending between at least two network elements of the telecommunication system for carrying optical addressing signals separated from their associated optical data signals, each of said at least two network elements having routing capabilities, the method comprising the steps of
providing a combination of said optical addressing signals to provide addressing information required for establishing an address for routing the optical data signals, and
providing at least one of said at least one optical fiber comprised in said first communication path for carrying said optical data signals separated from their associated optical addressing signals different from any of the one or more optical fibers comprised in said second communication path, and
wherein said optical data signals being conveyed separately from their associated optical addressing signals along said at least one optical fiber were generated at a plurality of different network elements, each of said plurality of different network elements having routing capabilities.

2. In a telecommunication system, a method for routing optical data signals between at least two routers in the system, said method comprising:
generating first optical addressing signals associated with the optical data signals by converting signals identifying a destination address into corresponding optical addressing signals;
transmitting said optical addressing signals separated from their associated optical data signals over one or more optical fibers comprised in a first communication path, said first communication path extending from one of the at least two routers to another router, each of said at least two routers having routing capabilities; and
concurrently or subsequently transmitting said optical data signals separated from their associated optical addressing signals to said another router via a second communication path comprising at least one optical fiber, said second communication path extending from said one router of the at least two routers to the another router, and comprising at least one optical fiber which is different from any of the at least one optical fibers comprised in said first communication path, wherein said optical data signals being conveyed separately from their associated optical addressing signals were generated at a plurality of different network elements, each of said at least two network elements having routing capabilities.

3. The method according to claim 2, further comprising the steps of:
generating new optical addressing signals associated with the next section of a transmission path extending from said one router of the at least two routers towards said destination address;
transmitting the new optical addressing signals over one or more optical fibers extending between said one router of the at least two routers and another router;
transmitting said optical data signals to said another router via an optical fiber extending between said one router of the at least two routers and said another router wherein said optical fiber over which said optical data signals are transmitted is different from said one or more optical fibers for carrying said optical data signals separated from their associated optical addressing signals; and
repeating the steps of generating new optical addressing signals, transmitting the new optical addressing signals separated from their associated optical data signals and transmitting said optical data signals separated from their associated new optical addressing signals to said another router, until said optical data signals are transmitted to said destination address via subsequent routers located along a transmission path extending towards said destination address.

4. The method according to claim 1, further comprising the step of transmitting, at one of two binary illumination states, the information extracted from at least one of the optical addressing signals.

5. The method according to claim 1, further comprising the steps of transmitting, at a certain illumination level, at least one of the optical addressing signals and presenting, by absence of illumination at least one other optical addressing signal.

6. The method according to claim 1, wherein at least two of the optical addressing signals are transmitted each at substantially the same wavelength and at a different illumination intensity and wherein each of the illumination intensities corresponds to a different addressing information.

7. The method according to claim 1, wherein at least two of the optical addressing signals are transmitted each at substantially the same intensity and at a different wavelength, and wherein each of the different wavelengths corresponds to a different addressing information.

8. The method according to claim 6, wherein an optical address is derived from a combination of at least two optical addressing signals each transmitted at a different wavelength and at a different intensity from the other.

9. The method according to claim 2, wherein the transmission of at least one of the optical data signals is delayed until the following steps are performed:
decoding said optical addressing signals;
deriving addressing information from the decoded optical addressing signals; and
if required, generating another, or using said, optical routing address for further routing of said optical data signals.

10. The method according to claim 9, wherein the transmission of said at least one of the optical data signals is delayed by allowing said at least one of the optical data signals to pass through an optic fiber of a length corresponding to a desired delay in the transmission.

11. The method according to claim 2, further comprising:
transmitting to said one of the at least two routers an indication that said optical data signals can be forwarded towards their destination;
receiving said indication at said one of the at least two routers; and
transmitting, responsive to receiving said indication, said optical data signals towards said another router along said data transmission path.

12. Routing apparatus for routing optical data signals, said apparatus comprises:
means for generating first optical addressing signals associated with said optical data signals by converting signals identifying a destination address into corresponding optical addressing signals;
means for transmitting said optical addressing signals from said routing apparatus to a second router over a first communication path comprising at least one optical fiber for carrying said optical addressing signals separated from their associated optical data signals, each of said routing apparatus and said second router having routing capabilities; and
means for transmitting said optical data signals from said routing apparatus to said second router along a second communication path comprising at least one optical fiber, said at least one optical fiber for carrying said optical data signals separated from their associated optical addressing signals and wherein said at least one optical fiber for carrying said optical data signals separated from their associated optical addressing signals is different from any of the at least one optical fibers comprised in said first communication path, and wherein said optical data signals being conveyed separately from their associated optical addressing signals, were generated at a plurality of different network elements, each of said plurality of different network elements having routing capabilities.

13. The apparatus according to claim 12, in which at least one of the optical addressing signals is transmitted at a certain illumination level and at least another optical addressing signal is presented by absence of illumination.

14. The apparatus according to claim 12, in which at least two of the optical addressing signals are transmitted at substantially similar wavelengths and at a different illumination intensity, and each of the illumination intensities corresponds to a different addressing information.

15. The apparatus according to claim 12, wherein at least two of the optical addressing signals are transmitted at a different wavelength, and each of the different wavelengths corresponds to a different addressing information.

16. The apparatus according to claim 15, wherein said at least two of the optical addressing signals are transmitted at substantially similar intensity.

17. The apparatus according to claim 12, in which at least two of the optical addressing signals are transmitted each at a wavelength and intensity that are different from the wavelength and intensity of the other one of said at least two of the optical addressing signals.

18. The apparatus according to claim 12, further comprising:
  means for delaying said optical data signals;
  means for decoding said optical addressing signals;
  means for deriving addressing information from the decoded optical addressing signals; and
  means for generating optical routing address signals for further routing of said optical data signals.

19. The apparatus according to claim 18, comprising an optic fiber for delaying the transmission of at least one of the optical data signals and means for directing said at least one of the optical data signals to pass through said optic fiber.

20. Apparatus for transmitting optical data signals between at least two network elements in a system, comprising:
  a) signal generating means for generating optical addressing signals associated with said optical data signals by converting signals identifying a destination address into corresponding optical addressing signals;
  b) transmission means for transmitting said optical addressing signals separated from their associated optical data signals over a first communication path comprising one or more optical fibers and extending between the at least two network elements towards said destination address, each of said at least two network elements having routing capabilities; and
  c) transmission means for transmitting said optical data signals towards said destination address along a second communication path comprising at least one optical fiber extending between the at least two network elements for conveying said optical data signals separated from their associated optical addressing signals, wherein at least one of said at least one optical fiber in said second communication path is different than any of the at least one optical fibers comprised in the second communication path, and wherein said optical data signals being conveyed separately from their associated optical addressing signals, were generated at a plurality of different network elements, each of said plurality of different network elements having routing capabilities.

21. The apparatus according to claim 20, further comprising means for receiving an indication that said optical data signals can be forwarded towards their destination, wherein said means for transmitting said optical data signals is adapted to transmit the optical data signals towards said destination responsive to receiving said indication.

22. A telecommunication routing apparatus comprising:
  a) receiving means for receiving first optical addressing signals;
  b) signal generation means for generating second optical addressing signals associated with the next section of a transmission path extending towards a destination address;
  c) transmission means for transmitting the second optical addressing signals separated from associated optical data signals over one or more optical fibers extending from said telecommunication routing apparatus towards the destination address representing a second network element, said telecommunication routing apparatus and said second network element each having routing capabilities;
  d) receiving means for receiving optical data signals generated at a plurality of different network elements, each of said plurality of different network elements having routing capabilities; and
  e) transmission means for transmitting the optical data signals received towards the destination address along an optical path extending from the telecommunication routing apparatus toward the second network element which comprises at least one optical fiber that is different from any one of said one or more optical fibers over which the second optical addressing signals separated from their associated optical data signals are transmitted.

* * * * *